United States Patent [19]
Umeda

[11] Patent Number: 5,404,677
[45] Date of Patent: Apr. 11, 1995

[54] TRIANGULAR WINDOW STRUCTURE OF AUTOMOTIVE SIDE DOOR

[75] Inventor: Yoshiyuki Umeda, Hamamatsu, Japan

[73] Assignee: Suzuki Motor Corporation, Shizuoka, Japan

[21] Appl. No.: 260,701

[22] Filed: Jun. 16, 1994

[30] Foreign Application Priority Data

Sep. 28, 1993 [JP] Japan .................................. 5-240785

[51] Int. Cl.6 .............................................. B60J 5/04
[52] U.S. Cl. .................................................... 49/502
[58] Field of Search ............... 49/502, 503; 296/146.2, 296/114

[56] References Cited

U.S. PATENT DOCUMENTS 4,651,470  3/1987  Imura et al. ........................ 49/502 X
4,874,201  10/1989  Scaglietti ........................... 49/502 X Primary Examiner—Philip C. Kannan
Attorney, Agent, or Firm—Arnold, White & Durkee

[57]. ABSTRACT

A triangular window structure of a side door of an automobile having a front sash and a center sash on opposite sides of the side door, comprising a triangular window frame constituted by the front sash, the center sash and a bracket connected to upper end portions of the front and center sashes, and a weather strip attached to the triangular window frame. The bracket has an integrally formed plate portion for reinforcing an upper end portion of the weather strip.

8 Claims, 4 Drawing Sheets

5,404,677

TRIANGULAR WINDOW STRUCTURE OF AUTOMOTIVE SIDE DOOR

FIELD OF THE INVENTION AND RELATED ART STATEMENT

The present invention relates to a triangular window structure of an automotive side door, and more particularly to such a triangular window structure with which the upper end portion of a weather strip is reinforced.

In convertible automobiles, a sash-less type side door 100 is often employed, as shown in FIG. 6. In such cases, in order to hold a side windowpane 101 securely, a triangular window 102 is disposed in front of the side windowpane 101. As shown in FIG. 7, the triangular window 102 comprises a triangular window frame 106 having front and center sashes 104 and 105 and extending over the upper portion of a side door panel 103. A weather strip 107 to be described later is attached to the outside of the triangular window frame 106, and a partition windowpane 108 is fitted into the triangular window frame 106 through a partition weather strip (not shown). The front sash 104 and the center sash 105 are connected at their upper end portions with each other at a center sash upper bracket 109.

However, an upper end portion 107a of the weather strip 107 cannot be supported, because the center sash 105 is short at the connected portion of the front and center sashes 104 and 105. Because of the shortness of the center sash 105, the upper end portion 107a of the weather strip 107 is left unsupported. When the side door 100 is closed, the upper end portion 107a of the weather strip 107 is separated from the connected portion of the front and center sashes 104 and 105, resulting in a bad appearance of the weather strip 107. In addition, water enters at the separated part of the weather strip 107 and leaks into the vehicle. If a reinforcing plate is made separately and incorporated into the upper end portion 107a of the weather strip 107, the cost of production will become high.

OBJECT AND SUMMARY OF THE INVENTION

It is, accordingly, an important object of the present invention to provide a triangular window structure for an automotive side door which is capable of holding the upper end portion of a weather strip.

It is another important object of the present invention to provide a triangular window structure for an automotive side door which is capable of preventing separation of the weather strip upper end portion.

It is still another important object of the present invention to provide a triangular window structure for an automotive side door in which a better external appearance is given to the weather strip.

The foregoing objects are accomplished in accordance with the present invention by providing a triangular window structure on a side door of an automobile which comprises: a triangular window frame comprising a front sash, and a center sash which is disposed at rear of the front sash and connected with the center sash at a top portion thereof; a weather strip disposed on the triangular window frame; and a center sash upper bracket for connecting upper end portions of the front and center sashes which has a integrally formed plate portion for reinforcing a tip portion of the weather strip.

In accordance with present invention, the triangular window frame is formed with the front sash and the center sash. Then the weather strip is attached to the triangular window frame and then a partition windowpane is mounted. The tip portion of the weather strip is reinforced and held by the plate portion of the bracket which is formed integrally with the center sash upper bracket. Accordingly, the tip portion of the weather strip can be held and prevented from being separated, and the external appearance of the weather strip can be improved.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
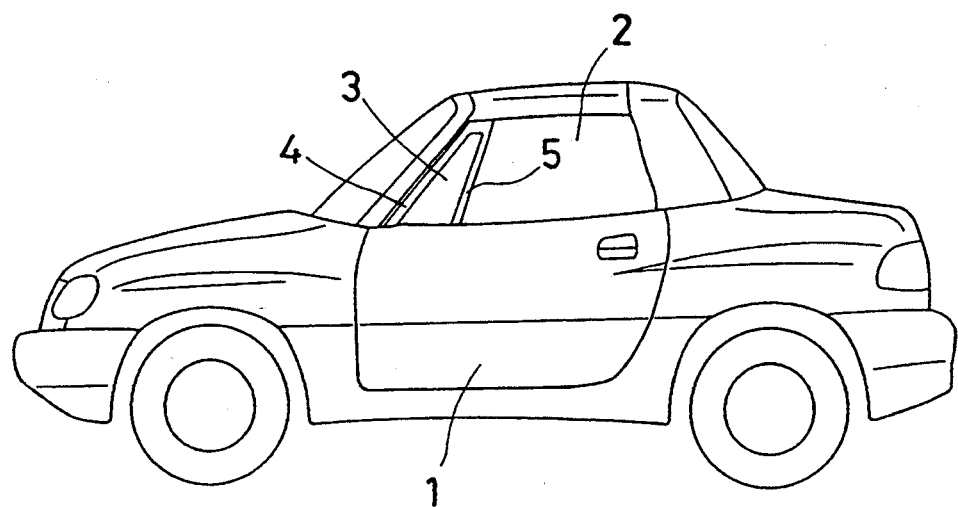
FIG. 1 is a side elevational view showing an automobile wherein a triangular window structure of a side door according to an embodiment of the present invention is employed.
Figure 2:
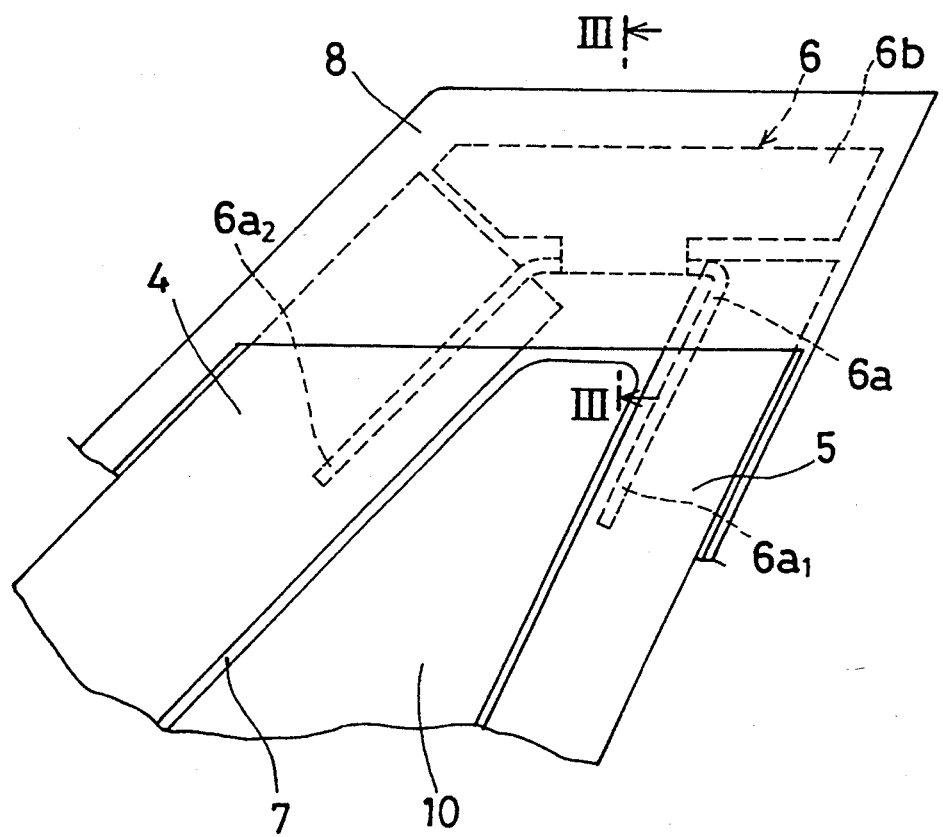
FIG. 2 is an enlarged side view showing the upper part of the triangular window structure in FIG. 1.
Figure 3:
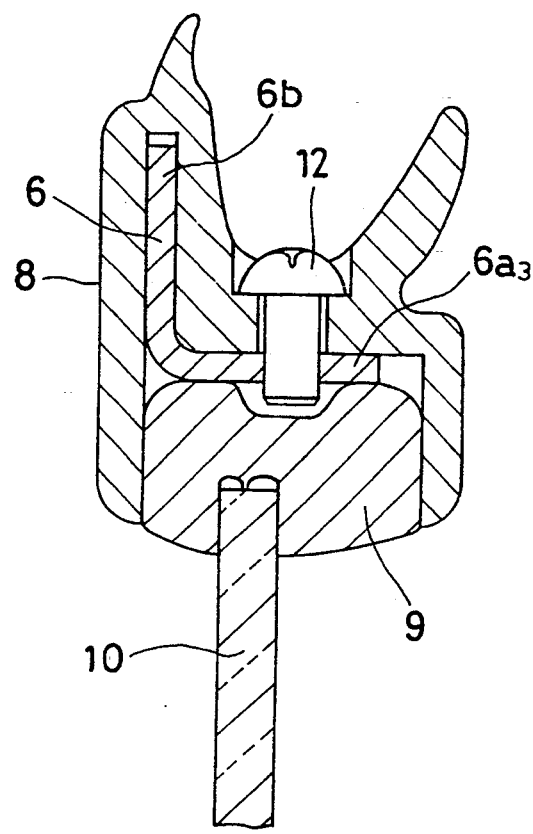
FIG. 3 is a sectional view of the triangular window structure in FIG. 2 taken substantially along line III—III of FIG. 2.
Figure 4:
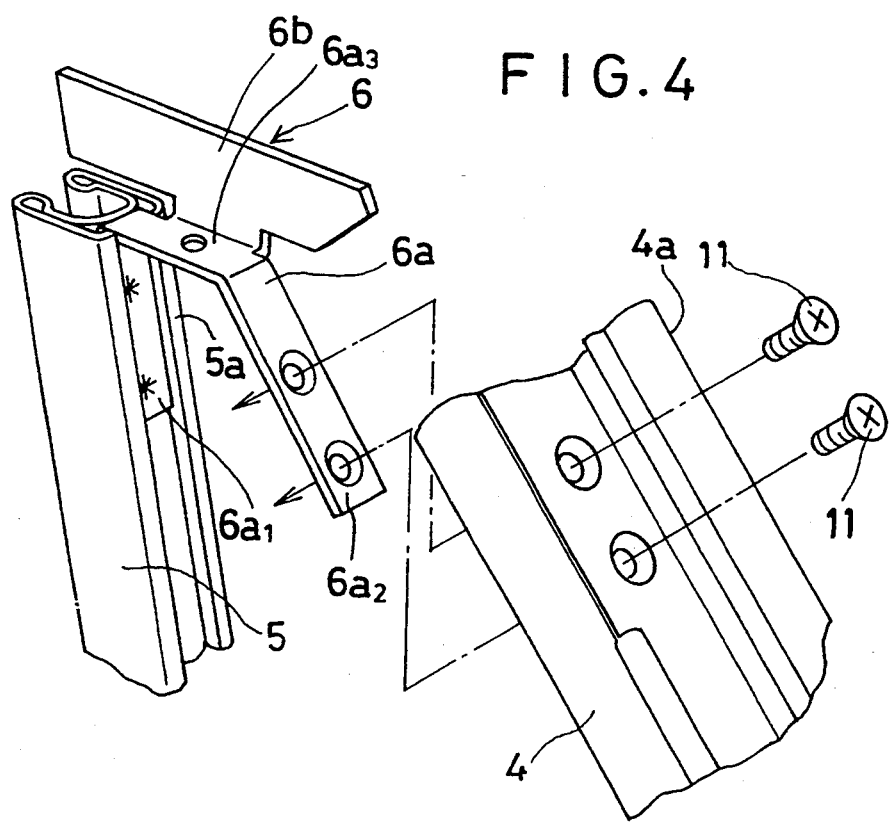
FIG. 4 is an exploded perspective view showing the upper part of the triangular window structure in FIG. 2.

Referring to FIGS. 1–4, there is shown a preferred embodiment of a triangular window structure of a side door in accordance with the present invention. Reference numeral 1 denotes a sash-less type side door, and a triangular window 3 is provided in front of the windowpane 2 of the side door 1. The triangular window 3 comprises a triangular window frame 7 by connecting the upper end portions of front and center sashes 4 and 5 through a center sash upper bracket 6. As shown in FIGS. 2 and 3, a weather strip 8 is attached to the outside of the triangular window frame 7 by means of a screw 12, and a partition windowpane 10 is fitted with a partition weather strip 9 into the triangular window frame 7. The center sash upper bracket 6, as shown in FIG. 4, comprises a bracket main body $6a$ and a vertical plate portion $6b$ integrally formed in the upper portion of the bracket main body $6a$. More particularly, the bracket main body $6a$ is constituted by a first leg portion $6a_1$ extending downward along the center sash 5, a second leg portion $6a_2$ extending obliquely along the front sash 4, and a horizontal wall portion $6a_3$ extending between the first and second leg portions $6a_1$ and $6a_2$. The horizontal wall portion $6a_3$ and the vertical plate portion $6b$ are formed into a sort of L shape, as shown in FIG. 3.

The center sash upper bracket 6 is attached as follows. By welding the first leg portion $6a_1$ of the bracket main body $6a$ to the side face of the center sash 5 and by connecting the second leg portion $6a_2$ of the bracket main body 6a to the front sash 4 by means of screws 11 and 11, the center sash 5 and the front sash 4 are connected with each other. As the bracket main body 6a is attached to the center sash 5 and the front sash 4, the plate portion 6b is flush with the outer face 4a of the front sash 4 and the outer face 5a of the center sash 5. In addition, the weather strip 8 is mounted on and attached closely to the inner wall of the plate portion 6b and the upper surface of the horizontal wall portion $6a_3$, as clearly shown in FIG. 3.

Figure 5:
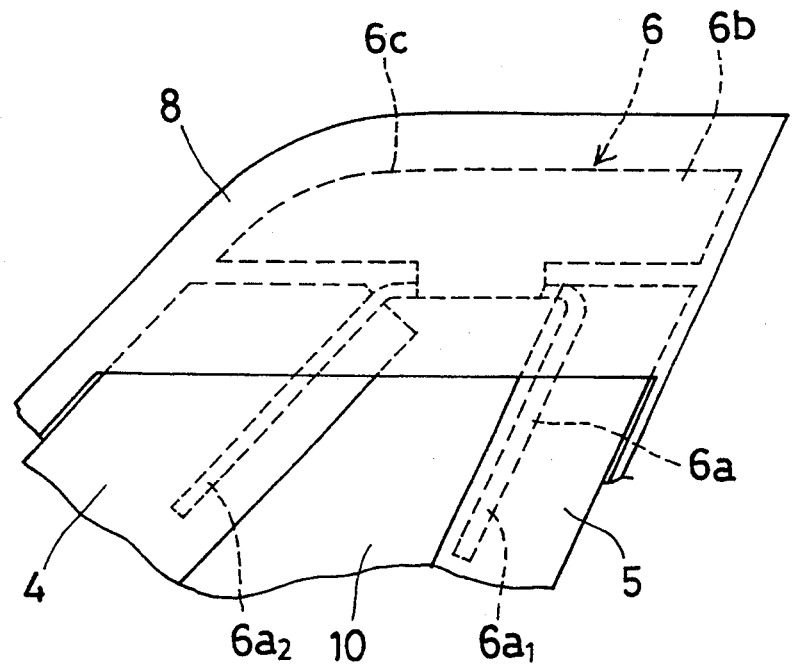
FIG. 5 is an enlarged side view showing the upper part of a triangular window structure of a side door according to another embodiment of the present invention.
Figure 6:
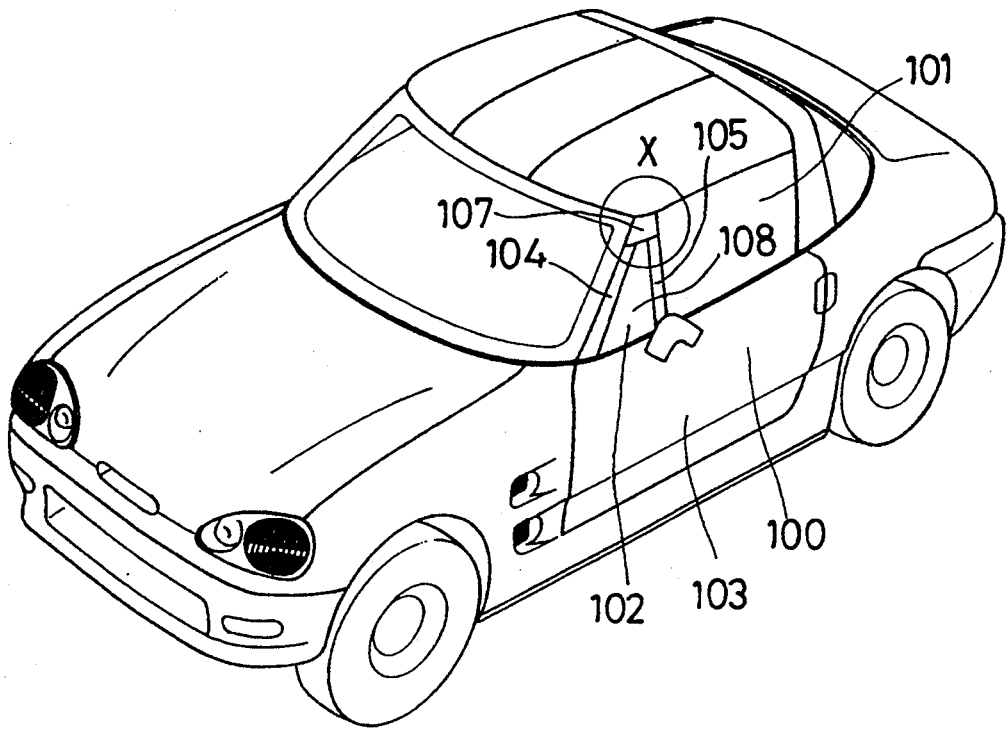
FIG. 6 a schematic view showing a conventional triangular window structure of a side window of an automobile.
Figure 7:
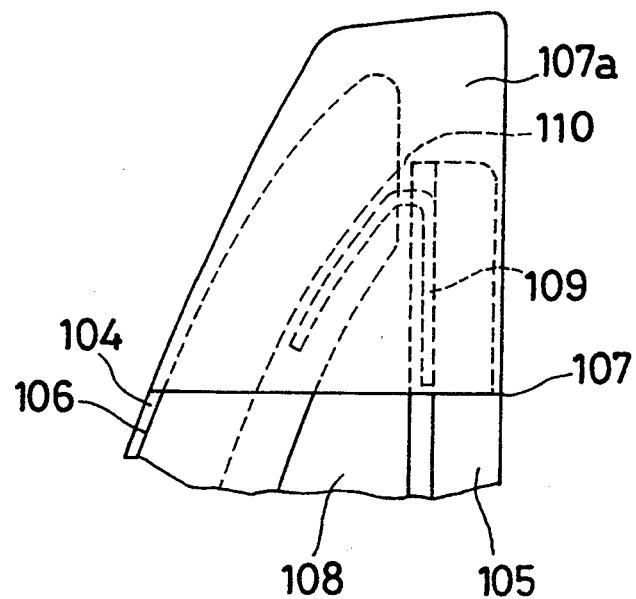
FIG. 7 is an enlarged side view showing the upper part of the triangular window structure of FIG. 6.

FIG. 5 illustrates the upper part of a triangular window structure of a side door according to another embodiment of the present invention. In this embodiment, the center sash upper bracket 6 can be formed conformably to the outer shape of the triangular window frame 7, by curving the plate portion 6b at 6c so that it conforms to the outer shape of the weather strip 8.

In accordance with the present invention, the upper end portion of the weather strip 8 is reinforced with the plate portion 6b of the center sash upper bracket 6. Accordingly, the upper end portion of the weather strip 8 can be prevented from being bent or separated from the bracket 6, and water leakage can also be prevented.

While the subjection invention has been described with relation to the preferred embodiments, various modifications and adaptations thereof will now be apparent to those skilled in the art. All such modifications and adaptations as fall within the scope of the appended claims are intended to be covered thereby.

What we claim is:

1. A triangular window structure on a side door of an automobile which comprises:
    a triangular window frame comprising a front sash, and a center sash which is disposed at rear of the front sash and connected with the center sash at a top portion thereof;
    a weather strip disposed on the triangular window frame;
    a center sash upper bracket for connecting upper end portions of the front and center sashes; and
    a plate portion formed integrally onto the center sash bracket for reinforcing a tip portion of the weather strip.

2. A triangular window structure as described in claim 1, wherein said plate portion of said center sash upper bracket is a substantially vertical wall, and a main body of said bracket extends substantially horizontally, and said plate portion and said bracket main body are substantially in an L-shaped configuration.

3. A triangular window structure as described in claim 2, wherein said plate portion of said bracket is flush with an outer face of said center sash and an outer face of said front sash.

4. A triangular window structure as described in claim 3, wherein said weather strip is attached securely to an inner wall of said plate portion and an upper surface of said bracket main body.

5. A triangular window structure as described in claim 1, wherein said weather strip is mounted on an upper surface of said bracket main body.

6. A triangular window structure as described in claim 5, wherein said weather strip is fixedly mounted on said bracket main body by means of a screw.

7. A triangular window structure as described in claim 1, wherein said bracket has an outer shape conforming to an outer shape of said weather strip.

8. A triangular window structure as described in claim 7, wherein an outer shape of said center sash upper bracket and an outer shape of said weather strip are curved at upper portions on the front sash side thereof.

* * * * *